US010536429B2

(12) United States Patent
Newton

(10) Patent No.: US 10,536,429 B2
(45) Date of Patent: Jan. 14, 2020

(54) CONVEYING INFORMATION IN HOSTNAME IN A CONTENT DELIVERY NETWORK (CDN)

(71) Applicant: Level 3 Communications, LLC, Broomfield, CO (US)

(72) Inventor: Christopher Newton, Westlake Village, CA (US)

(73) Assignee: Level 3 Communications, LLC, Broomfield, CO (US)

( * ) Notice: Subject to any disclaimer, the term of this patent is extended or adjusted under 35 U.S.C. 154(b) by 186 days.

(21) Appl. No.: 15/727,650

(22) Filed: Oct. 9, 2017

(65) Prior Publication Data

US 2019/0109813 A1 Apr. 11, 2019

(51) Int. Cl.
*H04L 12/00* (2006.01)
*H04L 29/12* (2006.01)
*H04L 29/06* (2006.01)

(52) U.S. Cl.
CPC .......... *H04L 61/2007* (2013.01); *H04L 61/10* (2013.01); *H04L 61/1511* (2013.01); *H04L 61/304* (2013.01); *H04L 61/305* (2013.01); *H04L 67/42* (2013.01)

(58) Field of Classification Search
CPC ..... H04L 61/2007; H04L 61/10; H04L 67/42; H04L 61/1511; H04L 29/12066; H04L 12/14; H04L 29/06; H04L 29/1266
USPC .................................. 709/245, 246, 201, 217
See application file for complete search history.

(56) References Cited

U.S. PATENT DOCUMENTS

| 6,108,703 | A  | * | 8/2000 | Leighton ................. H04L 29/06 709/226 |
| 6,405,252 | B1 | * | 6/2002 | Gupta ..................... H04L 12/14 370/229 |
| 7,240,100 | B1 | * | 7/2007 | Wein .................... H04L 67/1008 709/214 |
| 7,725,602 | B2 | * | 5/2010 | Liu .................... H04L 29/12066 709/217 |
| 8,024,468 | B2 | * | 9/2011 | Raciborski ........ H04L 29/12066 709/217 |

(Continued)

FOREIGN PATENT DOCUMENTS

WO WO-2012152771 A2 * 11/2012 ......... H04L 65/4084

OTHER PUBLICATIONS

International Search Report and Written Opinion of the International Searching Authority, dated Aug. 24, 2018, Int'l Appl. No. PCT/US18/032758, Int'l Filing Date May 15, 2018; 8 pgs.

*Primary Examiner* — Frantz Coby

(57) ABSTRACT

A computer-implemented method, in a content delivery (CD) network. The method includes: receiving a request regarding a first hostname including at least one tag and an encoding of the at least one address; removing the tag and the encoding of the address to form a second hostname; resolving the second hostname to obtain a set of one or more addresses, wherein the set does not include the at least one address; and returning the address set. On a client, the method includes: making a request for resolution of a first hostname; receiving one or more addresses; attempting to connect to at least one of the addresses; generating a modified hostname including at least one tag and an encoding of the at least one address; and requesting resolution of the modified hostname.

25 Claims, 7 Drawing Sheets

(56) References Cited

U.S. PATENT DOCUMENTS

| | | | | |
|---|---|---|---|---|
| 8,423,672 B2* | 4/2013 | Liu | ............ | H04L 29/12066 |
| | | | | 709/245 |
| 8,909,699 B2* | 12/2014 | Neerdaels | ............ | H04L 29/06 |
| | | | | 709/203 |
| 9,300,560 B2* | 3/2016 | Leighton | ............ | H04L 29/12066 |
| 9,531,628 B2* | 12/2016 | Freedman | ............ | H04L 45/02 |
| 9,565,157 B2* | 2/2017 | Chhabra | ............ | H04L 61/1511 |
| 9,647,983 B2* | 5/2017 | Lohner | ............ | H04L 61/1511 |
| 2003/0002484 A1 | 1/2003 | Freedman | | |
| 2009/0119397 A1* | 5/2009 | Neerdaels | ............ | H04L 29/06 |
| | | | | 709/223 |
| 2012/0198043 A1* | 8/2012 | Hesketh | ............ | H04L 29/1265 |
| | | | | 709/223 |
| 2016/0065597 A1 | 3/2016 | Nguyen | | |
| 2016/0255042 A1* | 9/2016 | Newton | ............ | H04L 47/70 |
| | | | | 709/245 |
| 2016/0255146 A1* | 9/2016 | Stolorz | ............ | H04L 29/06 |
| | | | | 709/224 |
| 2017/0339222 A1* | 11/2017 | Newton | ............ | H04L 67/1036 |

* cited by examiner cdn.example.com.c.fp.net

FIG. 2A bds--x.10.11.12.13.cdn.example.com.c.fp.net

FIG. 2B bds--x.10.11.12.13.x.13.12.11.10.cdn.example.com.c.fp.net

FIG. 2C

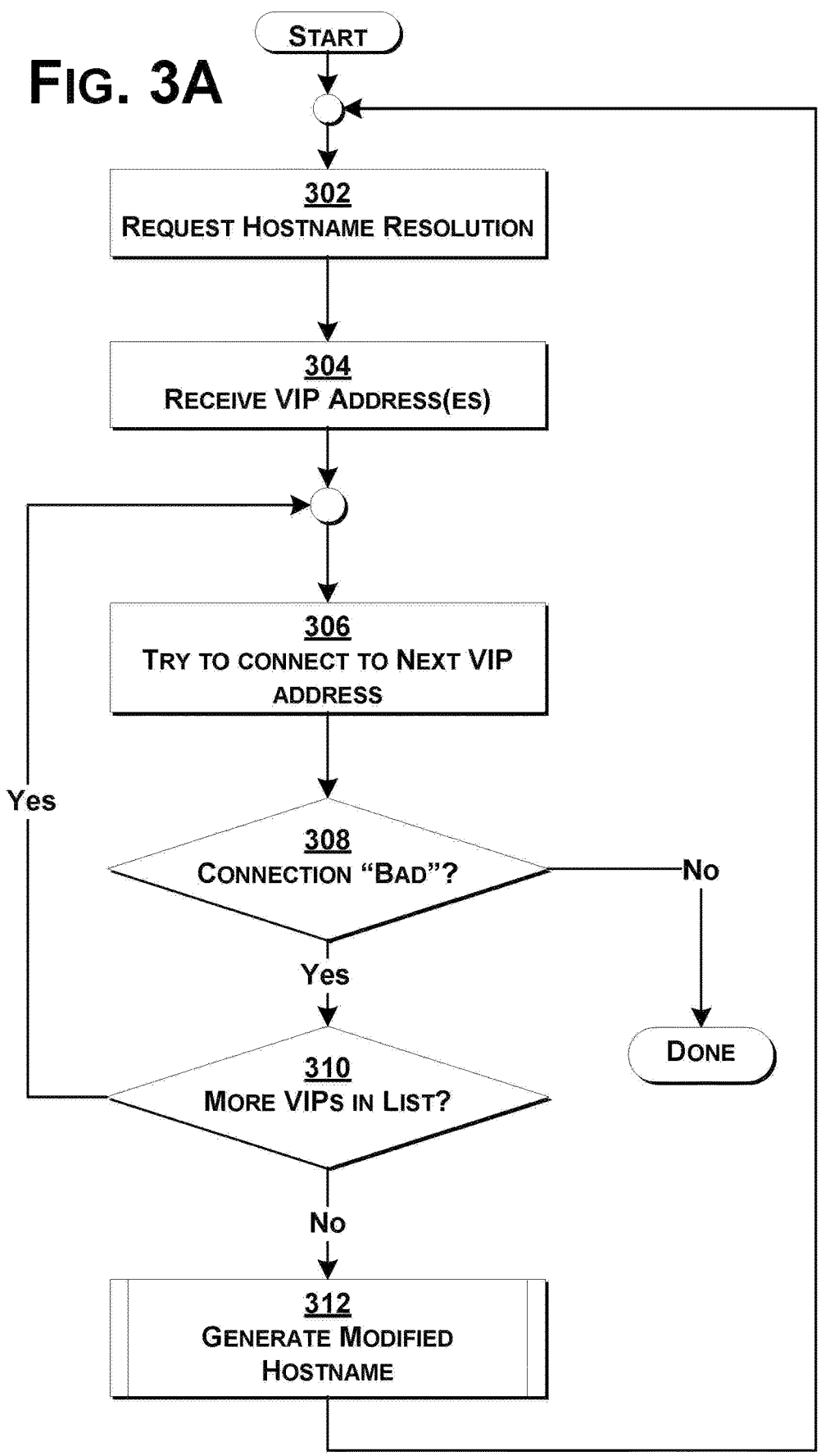

CONVEYING INFORMATION IN HOSTNAME IN A CONTENT DELIVERY NETWORK (CDN)

COPYRIGHT STATEMENT

This patent document contains material subject to copyright protection. The copyright owner has no objection to the reproduction of this patent document or any related materials in the files of the United States Patent and Trademark Office, but otherwise reserves all copyrights whatsoever.

BACKGROUND OF THE INVENTION

Field of the Invention

This invention relates to content delivery and content delivery networks. More specifically, this invention relates to conveying name-resolution information in hostnames in content delivery networks (CDNs).

INCORPORATION BY REFERENCE

The following U.S. Patents and U.S. patent applications are hereby fully incorporated herein by reference for all purposes:
1. U.S. Pat. No. 7,822,871 titled "Configurable Adaptive Global Traffic Control And Management," filed Sep. 30, 2002, issued Oct. 26, 2010.
2. U.S. Pat. No. 6,185,598 titled "Optimized Network Resource Location," filed Feb. 10, 1998, issued Feb. 6, 2001.
3. U.S. Pat. No. 7,860,964 titled "Policy-Based Content Delivery Network Selection," filed Oct. 26, 2007, issued Dec. 28, 2010.
4. U.S. Pat. No. 8,825,830, titled "Content delivery framework with dynamic service network topology," filed Mar. 15, 2013, issued Sep. 2, 2014.
5. U.S. Published Patent Application No. 2012-0198043, titled "Customized Domain Names In A Content Delivery Network (CDN)," filed Jan. 11, 2012, published Aug. 2, 2012.

BRIEF DESCRIPTION OF THE DRAWINGS

Other objects, features, and characteristics of the present invention as well as the methods of operation and functions of the related elements of structure, and the combination of parts and economies of manufacture, will become more apparent upon consideration of the following description and the appended claims with reference to the accompanying drawings, all of which form a part of this specification.

FIG. 2A shows a hostname;

FIGS. 2B-2C show exemplary hostnames according to exemplary embodiments hereof;

FIGS. 3A-3D are flowcharts showing aspects of the system according to exemplary embodiments hereof.

DETAILED DESCRIPTION OF THE PRESENTLY PREFERRED EXEMPLARY EMBODIMENTS

Glossary

As used herein, unless used otherwise, the following terms or abbreviations have the following meanings:

AS means autonomous system;
ASN means autonomous system number;
CD means content delivery;
CDN or CD network means content delivery network;
CIDR means Classless Inter-Domain Routing;
CNAME means canonical name;
DNS means domain name system;
IP means Internet Protocol;
IPv4 means Internet Protocol Version 4;
IPv6 means Internet Protocol Version 6;
IP address means an address used in the Internet Protocol, including both IPv4 and IPv6, to identify electronic devices such as servers and the like;
VIP address means virtual IP address; and
URL means uniform resource locator.

A "mechanism" refers to any device(s), process(es), routine(s), service(s), module(s), or combination thereof. A mechanism may be implemented in hardware, software, firmware, using a special-purpose device, or any combination thereof. A mechanism may be integrated into a single device or it may be distributed over multiple devices. The various components of a mechanism may be co-located or distributed. The mechanism may be formed from other mechanisms. In general, as used herein, the term "mechanism" may thus be considered shorthand for the term device(s) and/or process(es) and/or service(s).

Description

A content delivery network (CDN) distributes content (e.g., resources) efficiently to clients on behalf of one or more content providers, preferably via a public Internet. Content providers provide their content (e.g., resources) via origin sources (origin servers or origins). A CDN can also provide an over-the-top transport mechanism for efficiently sending content in the reverse direction—from a client to an origin server. Both end-users (clients) and content providers benefit from using a CDN. Using a CDN, a content provider is able to take pressure off (and thereby reduce the load on) its own servers (e.g., its origin servers). Clients benefit by being able to obtain content with fewer delays.

A content provider that uses a CDN may be referred to as a CDN subscriber or customer.

Figure 1:
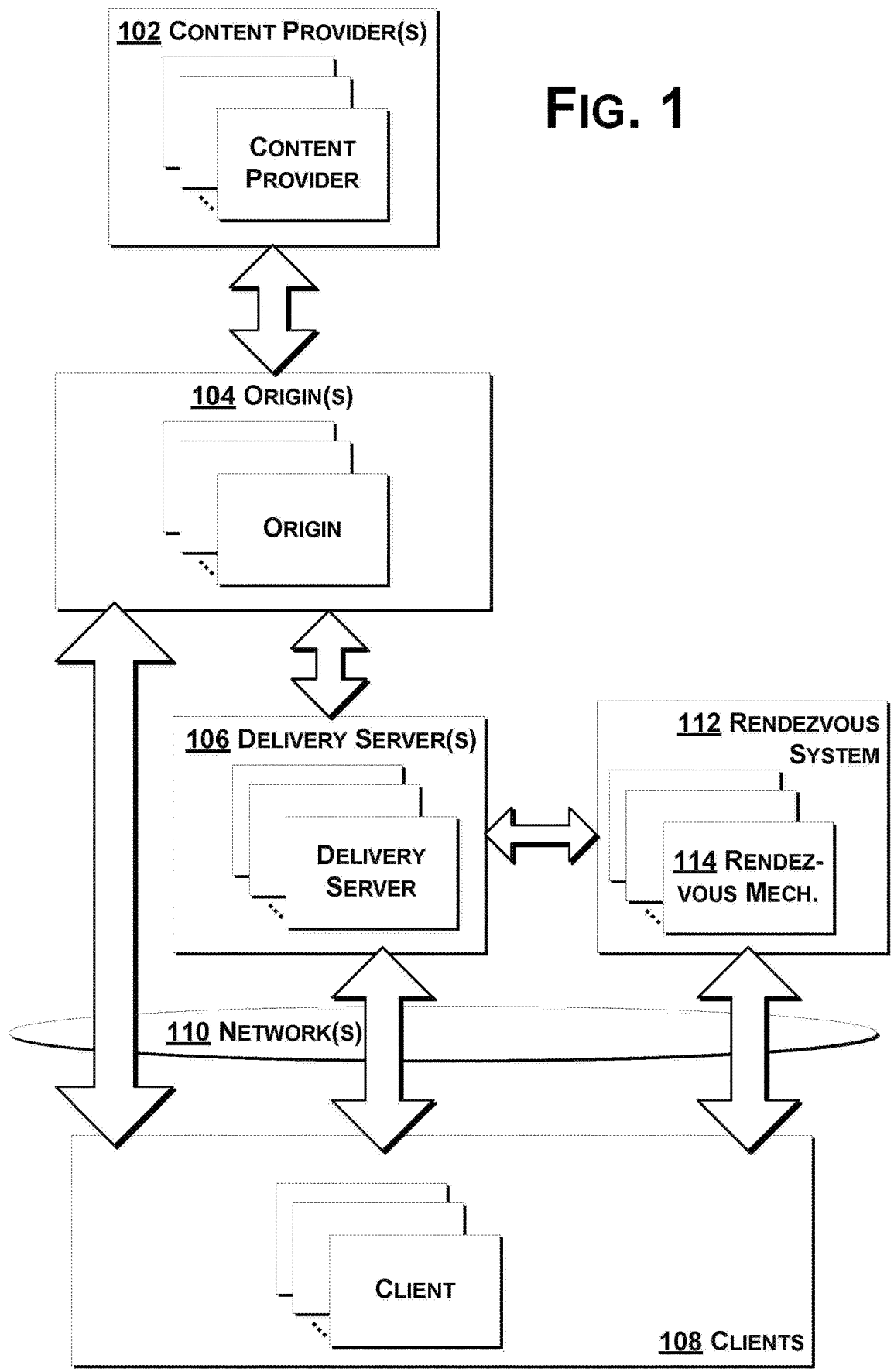
FIG. 1 depicts aspects of a content delivery network (CDN) according to exemplary embodiments hereof.

FIG. 1 shows aspects of an exemplary CDN in which one or more content providers (or subscribers) 102 provide content via one or more origin sources 104 and delivery services (servers) 106 to clients 108 via one or more networks 110. The delivery services (servers) 106 may form a delivery network from which clients 108 may obtain content. The delivery services 106 may be logically and/or physically organized hierarchically and may include edge caches.

A CDN provider typically maintains and operates content servers or server clusters (groups of multiple servers), e.g., delivery servers 106, at multiple locations in and around the CDN. The servers or server clusters may, e.g., be located at numerous different geographic regions (e.g., metropolitan areas) so that content can be stored proximate to users who request the content. As noted above, a CDN often includes servers at the so-called edge of the network (e.g., so-called "edge servers") and servers within the core of the network (e.g., so-called "origin servers"). Origin servers may store or retrieve content and furnish the content to the edge servers, which may in turn cache the content for later distribution. One or more intermediate tiers of servers may be used between the origin servers and the edge servers.

As should be appreciated, components of a CDN (e.g., delivery servers or the like) may use the CDN to deliver content to other CDN components. Thus, a CDN component may itself be a client of the CDN. For example, the CDN may use its own infrastructure to deliver CDN content (e.g., CDN control and configuration information) to CDN components.

Content associated with or provided by a particular content provider or subscriber may be referred to as a property. A property may be, e.g., a website and related content, and typically comprises multiple resources. A CDN may provide one or more properties associated with and/or on behalf of one or more content providers. That is, a CDN may serve content on behalf of multiple subscribers, and each particular subscriber may have multiple resources or properties associated therewith that are to be served by the CDN. A content provider may have more than one property, and thus a CDN may serve/provide one or more properties associated with and/or on behalf of a particular content provider.

Exemplary CDNs are described in U.S. Pat. No. 8,825,830, the entire contents of which are fully incorporated herein by reference in their entirety and for all purposes.

With reference again to FIG. 1, client requests (e.g., for content) may be associated with delivery server(s) 106 by a rendezvous system 112 comprising one or more rendezvous mechanism(s) 114, e.g., in the form of one or more rendezvous networks. The rendezvous mechanism(s) 114 may be implemented, at least in part, using or as part of a DNS system, and the association of a particular client request (e.g., for content) with one or more delivery servers may be done as part of DNS processing associated with that particular client request (e.g., DNS processing of a domain name associated with the particular client request).

As should be appreciated, typically, multiple delivery servers 106 in the CDN can process or handle any particular client request for content (e.g., for one or more resources). Preferably the rendezvous system 112 associates a particular client request with one or more "best" or "optimal" (or "least worst") delivery servers 106 (or server cluster(s)) to deal with that particular request. The "best" or "optimal" delivery server(s) 106 (or server cluster(s)) may be one(s) that is (are) close to the client (by some measure of network cost) and that is (are) not overloaded. Preferably the chosen delivery server(s) 106 (or server cluster(s)) (i.e., the delivery server(s) or cluster(s) chosen by the rendezvous system 112 for a client request) can deliver the requested content to the client or can direct the client, somehow and in some manner, to somewhere where the client can try to obtain the requested content. A chosen delivery server 106 (or server cluster(s)) need not have the requested content at the time the request is made, even if that chosen delivery server 106 (or server cluster) eventually serves the requested content to the requesting client.

Client requests to the CDN (e.g., for a resource or the like) typically involve a hostname. For example, a request for a resource may include a uniform resource locator (URL) for that resource. The client (or the client's resolver) may initiate name resolution of a hostname in the URL, and that name resolution will propagate to the rendezvous system 112 for server selection (sometimes in the form of a CNAME). When the rendezvous system 112 is implemented using or as part of a DNS system, the rendezvous mechanism(s) 114 may include DNS servers, and in response to a name resolution request, the rendezvous system returns one or more IP address to the client. The IP addresses may comprise one or more VIP addresses and are typically based on factors such as the client's location, load on the CDN servers (e.g., load on delivery servers 106), policies, network load, etc.

Exemplary server selection mechanisms are described in U.S. Pat. No. 6,185,598, and policy based name resolution is described in U.S. Pat. No. 7,822,871 titled "Configurable Adaptive Global Traffic Control And Management," the entire contents of both of which are hereby fully incorporated herein by reference for all purposes.

For example, a URL may contain the hostname "cdn.example.com," which may resolve, initially to a CNAME such as "cdn.example.com.c.fp.net" (FIG. 2A). The CNAMEd hostname will be resolved by the CDN's rendezvous system 112.

If a client receives a single IP (or VIP) address then it tries to connect to a delivery server at that address. If a client receives multiple IP (or VIP) addresses, then it should try them in some order (e.g., from first to last) until a connection is successfully made. It is expected that if any of those IP addresses are unreachable or otherwise return an error, the client should move to the next.

However, if all IP addresses fail, or if the client finds the connection(s) unsatisfactory (e.g., from a performance perspective), then the client may wish to re-resolve the hostname (or CNAME) to possibly get one or more different IP addresses from the rendezvous system 112.

In a conventional system, the client may get back the same list of addresses, especially since the name-to-address mapping is likely cached at the local resolver. Further, even if the client tries a different hostname (e.g., a backup name) for the same resource, the rendezvous system may still return the same unsatisfactory address(es).

Accordingly, in exemplary embodiments hereof, the client modifies the hostname (e.g., the CNAME) to include information about the undesired or bad addresses. This information may be included as one or more tagged prefixes in the hostname. For example, if the client wants to exclude a particular IP address from the re-resolution, the client may form a new or modified hostname with the tagged prefix identifying that particular IP address. The tagged prefixes may specify, e.g., an IP address (or address range), an autonomous system number (ASN), or a CIDR.

An exemplary syntax for the tagged prefix is the start tag "bds--" followed by one or more tags of the form:

x.<IP addr>|xA.<ASN>|xR.<CIDR>

Where <IP addr> is an IP address in the form aa.bb.cc.dd (for IPv4) or an appropriate format for IPv6. <ASN> is an autonomous system number. <CIDR> identifies Classless Inter-Domain Routing.

This approach allows an address (or addresses) that fail or that the client considers unsatisfactory or unsuitable to be indicated to the rendezvous system and thus to the appropriate DNS servers.

When the rendezvous mechanism(s) 114 receive a hostname with a start tag ("bds--") followed by one or more tagged prefixes, the rendezvous mechanism(s) do not return addresses that were tagged (or that correspond to the tags). The tags effectively provide a blacklist for the rendezvous mechanism(s).

For example, suppose that the hostname "cdn.example.com.c.fp.net" (FIG. 2A) is resolved (by the rendezvous system 112, e.g., by DNS mechanisms in the rendezvous system) and that the rendezvous system returned the IP address 10.11.12.13 that was found (e.g., by the client) to be bad. Recall that an address may be considered bad for a number of reasons (e.g., if the client cannot connect to a server at that address or if the client connects to the server but is unable to connect to the appropriate service on that server, or if the client is receiving poor service from that server).

Since the client considered the address (10.11.12.13) to be "bad," a second resolution may be performed of the modified (or new) hostname (FIG. 2B):

bds--x.10.11.12.13.cdn.example.com.c.fp.net and the server selection mechanism(s) in the rendezvous system will not return that bad address (10.11.12.13) to such a request. Multiple IP addresses may be specified as in, e.g. (FIG. 2C):

bds--x.10.11.12.13.x.13.12.11.10.cdn.example.com.c.fp.net

As will be appreciated, the rendezvous system may collect information about "bad" addresses and such collected information may inform decisions for other clients. The collected information may also be provided to other CDN components (e.g., map generation and/or testing) to determine whether an address that a client considers to be "bad" is actually down or disconnected from the network or having some other issues.

Recall that a CDN component may itself be a client of the CDN. Thus, as should be appreciated, the client in the above discussion may be a CDN component. For example, a client may be an edge server requesting content from an origin server.

Figure 3B:
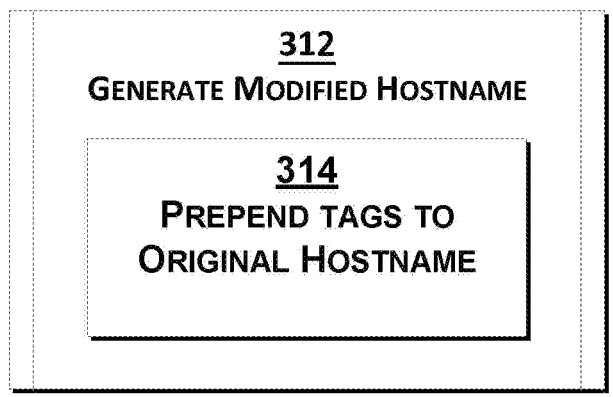
Figure 3C:
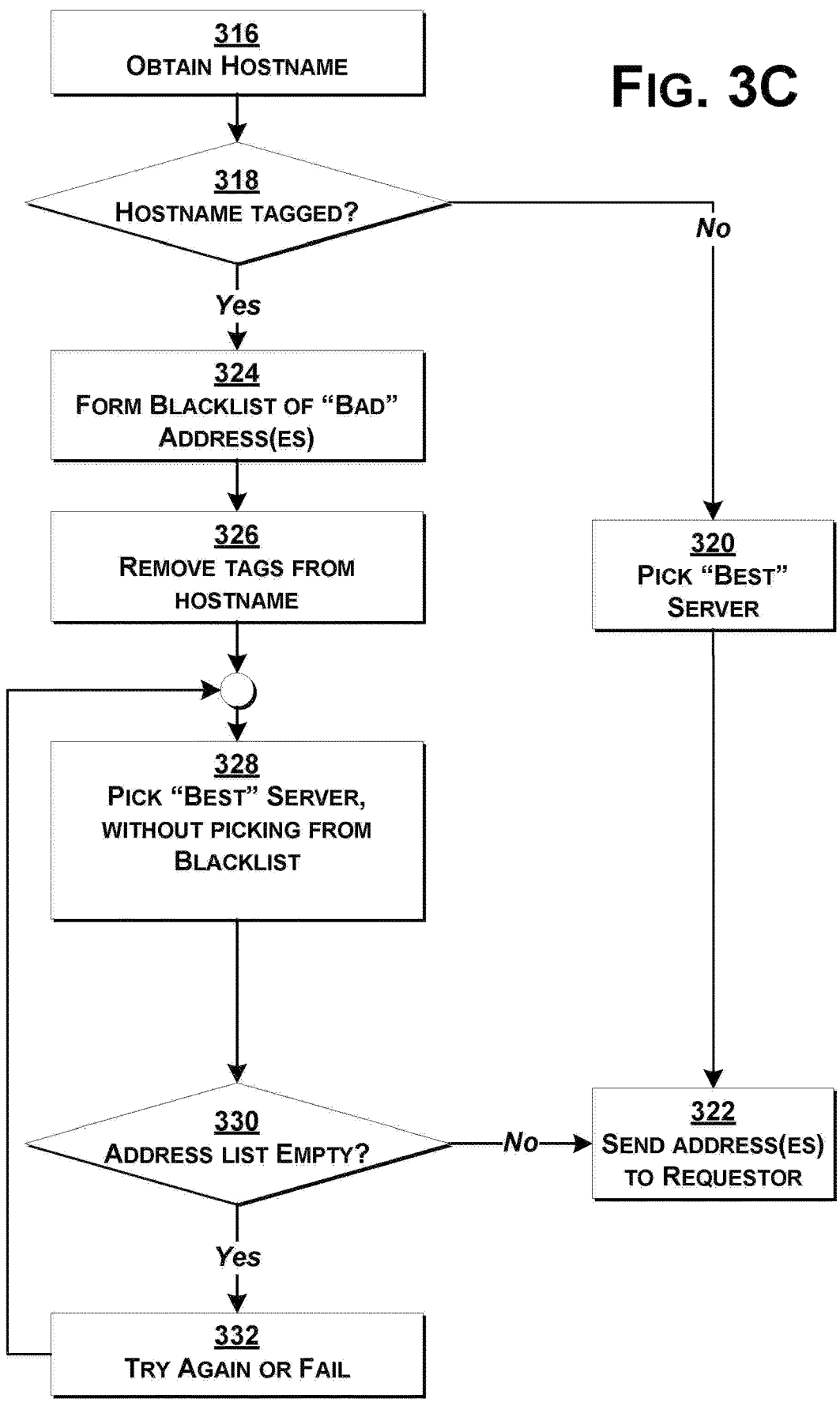

FIGS. 3A-3C are flowcharts showing aspects of the system according to exemplary embodiments hereof.

FIG. 3A is a flowchart showing exemplary operation of a client according to exemplary embodiments hereof. As part of request processing (e.g., for a resource corresponding to a particular URL), a client tries to resolve a hostname (at 302). The hostname may be from a URL. Assuming the URL is for a resource or content or service to be provided by the CDN, the hostname may be CNAMEd to a hostname for which the CDN is authoritative and that will be resolved by the CDN (i.e., by the rendezvous system in the CDN). For example, as shown above, the hostname cdn.example.com may be CNAMEd to cdn.example.com.c.fp.net (for which the CDN is authoritative).

The client receives (at 304) one or more VIPs from the CDN's rendezvous system. These VIPs should correspond to CDN servers that are "best" (by some measure(s)) for that client.

The client tries to connect to each VIP (e.g., in turn) (at 306). If the client's connection is not "bad" (as determined at 308) (e.g., the connection does not fail), then processing is done and the client request continues. However, if (at 308) the client considers that connection to be "bad" (e.g., the connection fails or the service is not available at the VIP), then the client may try another VIP in the list of VIP addresses. If there are no more VIPs in the list (at 310), then the client may generate a modified hostname (at 312) and retry the resolution (at 302), this time with the modified hostname.

As shown in FIG. 3B, the modified hostname may be generated (at 312) by prepending one or more tags to the original hostname (at 314). For example, as shown in FIGS. 2A-2B, if the VIP 10.11.12.13 is "bad," then the original hostname "cdn.example.com.c.fp.net" may be modified (at 314 in FIG. 3A-3B) by prepending the tags "bds--x.10.11.12.13." As another example, as shown in FIGS. 2A and 2C, if the VIPs 10.11.12.13 and 13.12.11.10 are bad, then the original hostname "cdn.example.com.c.fp.net" may be modified (at 314 in FIG. 3A-3B) by prepending the tags "bds--x.10.11.12.13.x.13.12.11.10."

FIG. 3C depicts aspects of the rendezvous-side (e.g., DNS-side) processing according to exemplary embodiments hereof.

As shown in FIG. 3C, (at 316) a rendezvous mechanism (e.g., 114 in FIG. 1) receives a hostname to be resolved. The rendezvous mechanism determines (at 318) whether the hostname is tagged (with tags described herein). If the hostname is not tagged (as determined at 318), then the rendezvous mechanism picks a "best" or "optimal" server (at 320) and sends the addresses (VIPs) to the requestor (at 322). The server selection may use, e.g., some or all of the rendezvous techniques described in U.S. Pat. No. 6,185,598, the entire contents of which have been fully incorporated herein for all purposes.

As should be appreciated, there may be more than one "best" or "optimal" server, and the server selection mechanism (e.g., the rendezvous mechanism(s) using DNS or the like) may select multiple servers. An appropriate "best" or "optimal" server may be one which is not too heavily loaded and which is not too far from the client in terms of some measure(s) of network distance.

If, on the other hand, the hostname is tagged (as determined at 318), then (at 324) the rendezvous mechanism forms a list of "bad" addresses (a blacklist) based on the tag information in the hostname. The rendezvous mechanism removes the tags from the hostname (at 326) and then tries to select a "best" or "optimal" server (at 328).

The best server selection (at 328) returns a list of one or more addresses (VIPs). In a presently preferred implementation, the server selection (at 328) does not consider addresses in the blacklist as available for selection, and so the resulting address list will not include any "bad" (or blacklisted) addresses.

If the address list returned by the best server selection is not empty (as determined at 330), then the address list is sent to the requestor (at 322).

Otherwise, if the address list is empty (as determined at 330), then the rendezvous mechanism may try again to pick a "best" server (at 328), or it may fail (at 332).

Figure 3D:
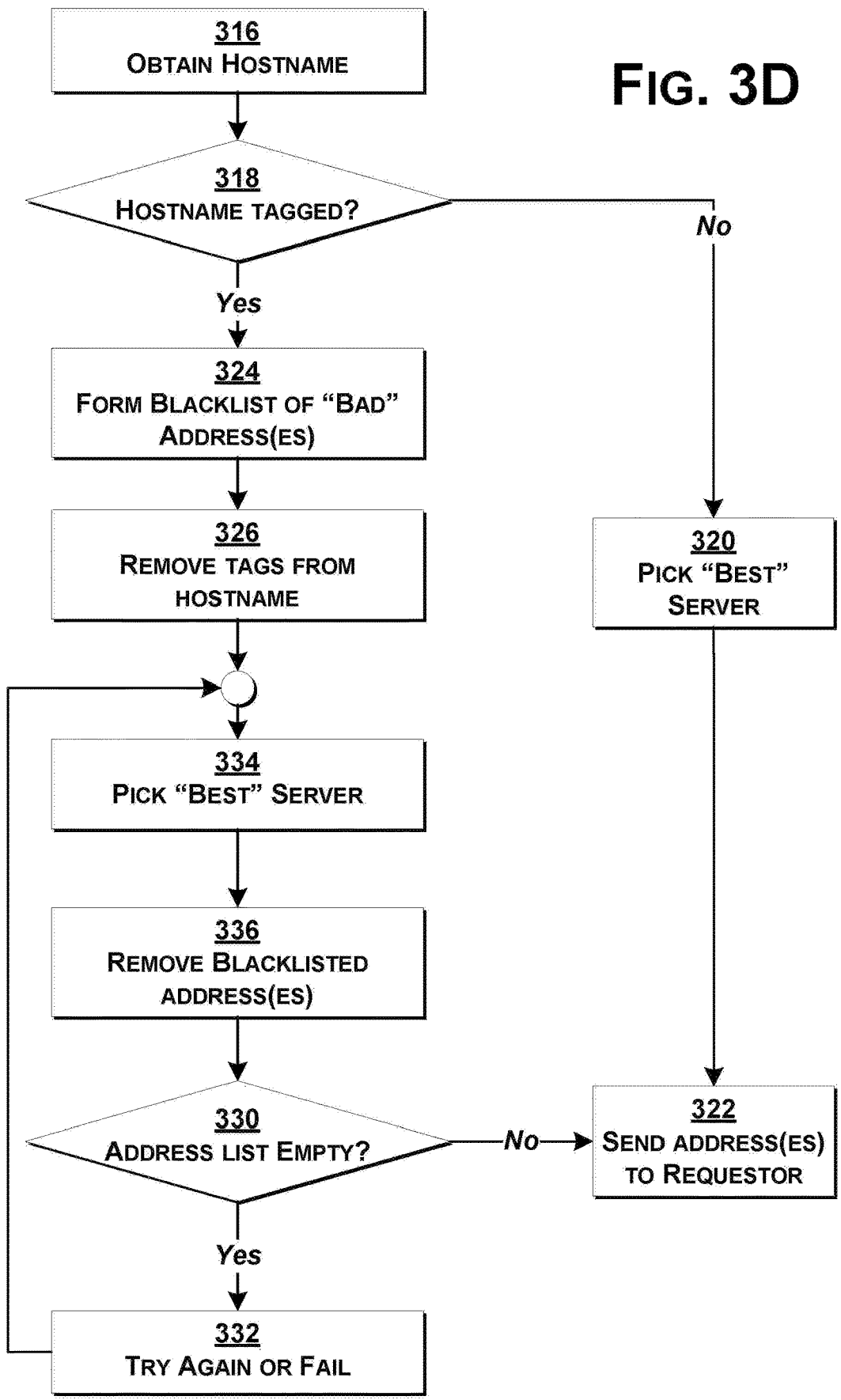

FIG. 3D shows an alternate embodiment in which the best server selection (at 334) returns a list of one or more addresses (VIPs) that may include "bad" or blacklisted addresses, and the rendezvous mechanism then (at 336) removes the bad address(es) from the list of "best" addresses.

If, after blacklisted addresses have been removed (at 336), there is still at least one address in the list (i.e., the list is not empty) (as determined at 330), then the list is sent to the requestor (at 322). Otherwise, if, after removal of the blacklisted addresses, the address list is empty (as determined at 330), then the rendezvous mechanism may try again to pick a "best" server (at 334), or it may fail (at 332).

Computing

The services, mechanisms, operations and acts shown and described above are implemented, at least in part, by software running on one or more computers of a CDN.

Programs that implement such methods (as well as other types of data) may be stored and transmitted using a variety of media (e.g., computer readable media) in a number of manners. Hard-wired circuitry or custom hardware may be used in place of, or in combination with, some or all of the software instructions that can implement the processes of various embodiments. Thus, various combinations of hardware and software may be used instead of software only.

One of ordinary skill in the art will readily appreciate and understand, upon reading this description, that the various processes described herein may be implemented by, e.g., appropriately programmed general purpose computers, special purpose computers and computing devices. One or more such computers or computing devices may be referred to as a computer system.

Figure 4:
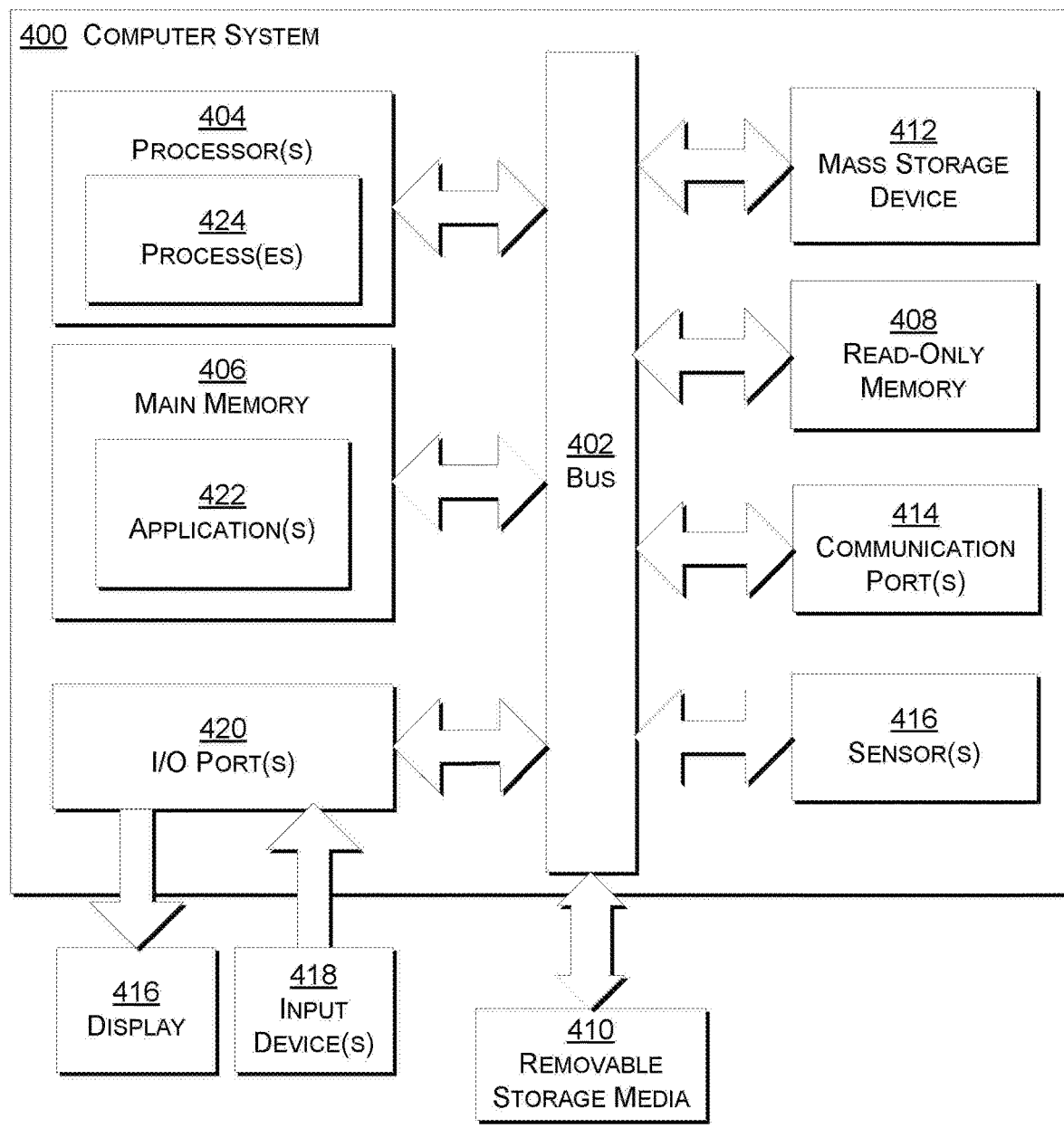
FIG. 4 depicts aspects of computing according to exemplary embodiments hereof.

FIG. 4 is a schematic diagram of a computer system 400 upon which embodiments of the present disclosure may be implemented and carried out.

According to the present example, the computer system 400 includes a bus 402 (i.e., interconnect), one or more processors 404, a main memory 406, read-only memory 408, removable storage media 410, mass storage 412, and one or more communications ports 414. Communication port 414 may be connected to one or more networks by way of which the computer system 400 may receive and/or transmit data.

As used herein, a "processor" means one or more microprocessors, central processing units (CPUs), computing devices, microcontrollers, digital signal processors, or like devices or any combination thereof, regardless of their architecture. An apparatus that performs a process can include, e.g., a processor and those devices such as input devices and output devices that are appropriate to perform the process.

Processor(s) 404 can be any known processor, such as, but not limited to, an Intel® Itanium® or Itanium 2® processor(s), AMD® Opteron® or Athlon MP® processor(s), or Motorola® lines of processors, and the like. Communications port(s) 414 can be any of an RS-232 port for use with a modem based dial-up connection, a 10/100 Ethernet port, a Gigabit port using copper or fiber, or a USB port, and the like. Communications port(s) 414 may be chosen depending on a network such as a Local Area Network (LAN), a Wide Area Network (WAN), a CDN, or any network to which the computer system 400 connects. The computer system 400 may be in communication with peripheral devices (e.g., display screen 416, input device(s) 418) via Input/Output (I/O) port 420.

Main memory 406 can be Random Access Memory (RAM), or any other dynamic storage device(s) commonly known in the art. Read-only memory 408 can be any static storage device(s) such as Programmable Read-Only Memory (PROM) chips for storing static information such as instructions for processor 404. Mass storage 412 can be used to store information and instructions. For example, hard disks such as the Adaptec® family of Small Computer Serial Interface (SCSI) drives, an optical disc, an array of disks such as Redundant Array of Independent Disks (RAID), such as the Adaptec® family of RAID drives, or any other mass storage devices may be used.

Bus 402 communicatively couples processor(s) 404 with the other memory, storage, and communications blocks. Bus 402 can be a PCI/PCI-X, SCSI, a Universal Serial Bus (USB) based system bus (or other) depending on the storage devices used, and the like. Removable storage media 410 can be any kind of external hard-drives, floppy drives, IOMEGA® Zip Drives, Compact Disc-Read Only Memory (CD-ROM), Compact Disc-Re-Writable (CD-RW), Digital Versatile Disk-Read Only Memory (DVD-ROM), etc.

Embodiments herein may be provided as one or more computer program products, which may include a machine-readable medium having stored thereon instructions, which may be used to program a computer (or other electronic devices) to perform a process. As used herein, the term "machine-readable medium" refers to any medium, a plurality of the same, or a combination of different media, which participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory, which typically constitutes the main memory of the computer. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications.

The machine-readable medium may include, but is not limited to, floppy diskettes, optical discs, CD-ROMs, magneto-optical disks, ROMs, RAMs, erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments herein may also be downloaded as a computer program product, wherein the program may be transferred from a remote computer to a requesting computer by way of data signals embodied in a carrier wave or other propagation medium via a communication link (e.g., modem or network connection).

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols; and/or (iv) encrypted in any of a variety of ways well known in the art.

A computer-readable medium can store (in any appropriate format) those program elements that are appropriate to perform the methods.

As shown, main memory 406 is encoded with application(s) 422 that supports the functionality discussed herein (the application 422 may be an application that provides some or all of the functionality of the CD services described herein, including rendezvous services). Application(s) 422 (and/or other resources as described herein) can be embodied as software code such as data and/or logic instructions (e.g., code stored in the memory or on another computer readable medium such as a disk) that supports processing functionality according to different embodiments described herein.

During operation of one embodiment, processor(s) 404 accesses main memory 406 via the use of bus 402 in order to launch, run, execute, interpret or otherwise perform the logic instructions of the application(s) 422. Execution of application(s) 422 produces processing functionality of the service related to the application(s). In other words, the process(es) 424 represent one or more portions of the application(s) 422 performing within or upon the processor(s) 404 in the computer system 400.

It should be noted that, in addition to the process(es) 424 that carries (carry) out operations as discussed herein, other embodiments herein include the application 422 itself (i.e., the un-executed or non-performing logic instructions and/or data). The application 422 may be stored on a computer readable medium (e.g., a repository) such as a disk or in an optical medium. According to other embodiments, the application 422 can also be stored in a memory type system such as in firmware, read only memory (ROM), or, as in this example, as executable code within the main memory 406 (e.g., within Random Access Memory or RAM). For example, application 422 may also be stored in removable storage media 410, read-only memory 408 and/or mass storage device 412.

Those skilled in the art will understand that the computer system 400 can include other processes and/or software and hardware components, such as an operating system that controls allocation and use of hardware resources.

As discussed herein, embodiments of the present invention include various steps or operations. A variety of these steps may be performed by hardware components or may be embodied in machine-executable instructions, which may be used to cause a general-purpose or special-purpose processor programmed with the instructions to perform the operations. Alternatively, the steps may be performed by a combination of hardware, software, and/or firmware. The term "module" refers to a self-contained functional component, which can include hardware, software, firmware or any combination thereof.

One of ordinary skill in the art will readily appreciate and understand, upon reading this description, that embodiments of an apparatus may include a computer/computing device operable to perform some (but not necessarily all) of the described process.

Embodiments of a computer-readable medium storing a program or data structure include a computer-readable medium storing a program that, when executed, can cause a processor to perform some (but not necessarily all) of the described process.

Where a process is described herein, those of ordinary skill in the art will appreciate that the process may operate without any user intervention. In another embodiment, the process includes some human intervention (e.g., a step is performed by or with the assistance of a human).

As used herein, including in the claims, the term "content" means, without limitation, any kind of data, in any form, regardless of its representation and regardless of what it represents. Content may include, without limitation, static and/or dynamic images, text, audio content, including streamed audio, video content, including streamed video, web pages, computer programs, documents, files, and the like. Some content may be embedded in other content, e.g., using markup languages such as hypertext markup language (HTML) and extensible markup language (XML). Content includes content that is created or formed or composed specifically in response to a particular request. The term "resource" is sometimes used herein to refer to content.

As used herein, including in the claims, the phrase "at least some" means "one or more," and includes the case of only one. Thus, e.g., the phrase "at least some services" means "one or more services", and includes the case of one service.

As used herein, including in the claims, the phrase "based on" means "based in part on" or "based, at least in part, on," and is not exclusive. Thus, e.g., the phrase "based on factor X" means "based in part on factor X" or "based, at least in part, on factor X." Unless specifically stated by use of the word "only", the phrase "based on X" does not mean "based only on X."

As used herein, including in the claims, the phrase "using" means "using at least," and is not exclusive. Thus, e.g., the phrase "using X" means "using at least X." Unless specifically stated by use of the word "only", the phrase "using X" does not mean "using only X."

In general, as used herein, including in the claims, unless the word "only" is specifically used in a phrase, it should not be read into that phrase.

As used herein, including in the claims, the phrase "distinct" means "at least partially distinct." Unless specifically stated, distinct does not mean fully distinct. Thus, e.g., the phrase, "X is distinct from Y" means that "X is at least partially distinct from Y," and does not mean that "X is fully distinct from Y." Thus, as used herein, including in the claims, the phrase "X is distinct from Y" means that X differs from Y in at least some way.

As used herein, including in the claims, a list may include only one item, and, unless otherwise stated, a list of multiple items need not be ordered in any particular manner A list may include duplicate items. For example, as used herein, the phrase "a list of CDN services" may include one or more CDN services.

It should be appreciated that the words "first" and "second" in the description and claims are used to distinguish or identify, and not to show a serial or numerical limitation. Similarly, the use of letter or numerical labels (such as "(a)", "(b)", and the like) are used to help distinguish and/or identify, and not to show any serial or numerical limitation or ordering.

No ordering is implied by any of the labeled boxes in any of the flow diagrams unless specifically shown and stated. When disconnected boxes are shown in a diagram, the activities associated with those boxes may be performed in any order, including fully or partially in parallel.

While the invention has been described in connection with what is presently considered to be the most practical and preferred embodiments, it is to be understood that the invention is not to be limited to the disclosed embodiment, but on the contrary, is intended to cover various modifications and equivalent arrangements included within the spirit and scope of the appended claims.

I claim:

1. A computer-implemented method, in a content delivery (CD) network, wherein said CD network (CDN) delivers content on behalf of multiple content providers, the method comprising, at a client:
    (A) making, by the client, a request for resolution of a first hostname;
    (B) in response to said request, receiving, at the client and from a server in the CDN, one or more addresses;
    (C) unsuccessfully attempting, by the client, to connect to at least one address of said one or more addresses;
    (D) in response to said unsuccessfully attempting to connect to said at least one address, generating, by the client, a modified hostname, said modified hostname including at least one tag and an encoding of said at least one address; and
    (E) requesting, by the client, resolution of said modified hostname.

2. The method of claim 1 wherein said modified hostname comprises:
    said at least one tag and said encoding of said at least one address prepended to said first hostname.

3. The method of claim 2 wherein the modified hostname comprises a first tag for a first address of the at least one address and a second tag for a second address of said at least one address.

4. The method of claim 2 wherein said modified hostname comprises a first tag and a second tag encoding information about an autonomous system number (ASN).

5. The method of claim 2 wherein said modified hostname comprises a first tag and a second tag encoding information about Classless Inter-Domain Routing (CIDR).

6. The method of claim 1 wherein said first hostname was associated with uniform resource locator (URL).

7. The method of claim 1 wherein said one or more addresses comprise one or more Internet Protocol (IP) addresses.

8. The method of claim 7 wherein said one or more addresses comprise one or more virtual IP addresses.

9. The method of claim 1 wherein act (D) is performed in response to a quality of a connection formed in (C).

10. A computer-implemented method, in a content delivery (CD) network, wherein said CD network (CDN) delivers content on behalf of multiple content providers, the method comprising:
(A) receiving, from a client, a request regarding a first hostname, said first hostname including at least one tag and an encoding of said at least one address;
(B) removing said at least one tag and said encoding of said at least one address to form a second hostname;
(C) resolving said second hostname to obtain a first set of one or more addresses, wherein the resolving comprises, in response to receiving the request including the encoding of said at least one address, causing said at least one address to be omitted from the first set; and
(D) when said first set is non-empty, returning said first address set to the client.

11. The method of claim 10, further comprising:
when said first address set is empty, attempting to resolve said second hostname again.

12. The method of claim 10 wherein the request regarding the first hostname comprises a request to resolve said first hostname for a client.

13. The method of claim 12, wherein said resolving in (C) is based on an address associated with the client request.

14. The method of claim 13 wherein the address associated with the client request is an Internet Protocol (IP) address of the client.

15. The method of claim 10 wherein said second address set comprises one or more Internet Protocol (IP) addresses.

16. The method of claim 15 wherein said one or more addresses comprise one or more virtual IP addresses.

17. The method of claim 10 wherein said encoding of said at least one address encodes at least one Internet Protocol (IP) address.

18. The method of claim 10 wherein said encoding of said at least one address encodes information about an autonomous system number (ASN).

19. The method of claim 10 wherein said encoding of said at least one address encodes information about Classless Inter-Domain Routing (CIDR).

20. The method of claim 10 wherein said second hostname is included in said first hostname.

21. The method of claim 20 wherein said first hostname comprises said at least one tag and said encoding of said at least one address prepended to said second hostname.

22. An article of manufacture comprising a computer-readable medium having program instructions stored thereon, the program instructions, wherein execution of the program instructions by one or more processors of said computer system causes the one or more processors to carry out the acts of:
(A) making, by a client, a request for resolution of a first hostname;
(B) in response to said request, receiving, by the client and from a server, one or more addresses;
(C) unsuccessfully attempting, by the client, to connect to at least one address of said one or more addresses;
(D) in response to said unsuccessfully attempting to connect to said at least one address, generating, by the client, a modified hostname, said modified hostname including at least one tag and an encoding of said at least one address; and
(E) requesting, by the client, resolution of said modified hostname.

23. An article of manufacture comprising a computer-readable medium having program instructions stored thereon, the program instructions, operable on a computer system in a content delivery network (CDN), said device implementing at least one content delivery (CD) service, wherein execution of the program instructions by one or more processors of said computer system causes the one or more processors to carry out the acts of:
(A) receiving, from a client, a request regarding a first hostname, said first hostname including at least one tag and an encoding of said at least one address;
(B) removing said at least one tag and said encoding of said at least one address to form a second hostname;
(C) resolving said second hostname to obtain a first set of one or more addresses, wherein the resolving comprises, in response to receiving the request including the encoding of said at least one address, causing said at least one address to be omitted from the first set; and
(D) when said first set is non-empty, returning said first address set to the client.

24. A client device configured to:
(A) make a request for resolution of a first hostname;
(B) in response to said request, receive one or more addresses from a server;
(C) unsuccessfully attempt to connect to at least one address of said one or more addresses;
(D) in response to said unsuccessful attempt to connect to said at least one address, generate a modified hostname, said modified hostname including at least one tag and an encoding of said at least one address; and
(E) request resolution of said modified hostname.

25. A device in a content delivery network (CDN), wherein said CDN delivers content on behalf of at least one content provider, said device implementing a content delivery (CD) service, the device:
(A) receiving, from a client, a request regarding a first hostname, said first hostname including at least one tag and an encoding of said at least one address;
(B) removing said at least one tag and said encoding of said at least one address to form a second hostname;
(C) resolving said second hostname to obtain a first set of one or more addresses, wherein the resolving comprises, in response to receiving the request including the encoding of said at least one address, causing said at least one address to be omitted from the first set; and
(D) when said first set is non-empty, returning said first address set to the client.

* * * * *